US011243750B2

(12) United States Patent
Fu et al.

(10) Patent No.: US 11,243,750 B2
(45) Date of Patent: Feb. 8, 2022

(54) CODE COMPLETION WITH MACHINE LEARNING

(71) Applicant: MICROSOFT TECHNOLOGY LICENSING, LLC., Redmond, WA (US)

(72) Inventors: Shengyu Fu, Redmond, WA (US); Xiaoyu Liu, Bothell, WA (US); Neelakantan Sundaresan, Bellevue, WA (US)

(73) Assignee: MICROSOFT TECHNOLOGY LICENSING LLC, Redmond, WA (US)

(*) Notice: Subject to any disclaimer, the term of this patent is extended or adjusted under 35 U.S.C. 154(b) by 86 days.

(21) Appl. No.: 16/866,433

(22) Filed: May 4, 2020

(65) Prior Publication Data
US 2020/0272443 A1 Aug. 27, 2020
US 2021/0357193 A9 Nov. 18, 2021

Related U.S. Application Data

(63) Continuation-in-part of application No. 15/939,742, filed on Mar. 29, 2018, now Pat. No. 10,671,355.

(60) Provisional application No. 62/619,806, filed on Jan. 21, 2018.

(51) Int. Cl.
G06F 8/41 (2018.01)
G06K 9/62 (2006.01)
G06N 20/00 (2019.01)

(52) U.S. Cl.
CPC ........... G06F 8/447 (2013.01); G06K 9/6256 (2013.01); G06K 9/6297 (2013.01); G06N 20/00 (2019.01)

(58) Field of Classification Search
CPC ......... G06F 8/33; G06F 8/447; G06K 9/6255; G06K 9/6256; G06K 9/6297
See application file for complete search history.

(56) References Cited

U.S. PATENT DOCUMENTS 10,671,355 B2   6/2020  Banuelos et al.
2008/0320444 A1  12/2008  Meijer et al.
2011/0283257 A1  11/2011  Charisius et al.

OTHER PUBLICATIONS

M. Asaduzzaman, C. K. Roy, S. Monir and K. A. Schneider, "Exploring API method parameter recommendations," 2015 IEEE International Conference on Software Maintenance and Evolution (ICSME), 2015, pp. 271-280, doi: 10.1109/ICSM.2015.7332473. (Year: 2015).*
Asaduzzaman, et al., "CSCC: Simple, Efficient, Context Sensitive Code Completion", In Proceedings of the IEEE International Conference on Software Maintenance and Evolution, Sep. 29, 2014, pp. 71-80.

(Continued)

Primary Examiner — Hanh Thi-Minh Bui

(57) ABSTRACT

A code completion tool uses machine learning models to more precisely predict the likelihood of a method invocation completing a code fragment that follows one or more method invocations of different classes in a same document during program development. In one aspect, the machine learning model is a n-order Markov chain model that is trained on features that represent characteristics of the context of method invocations found in commonly-used programs from a sampled population. The machine learning model is implemented as a hash table contained a ranked order of hash values in descending order of probability of completing a partially-formed method invocation.

20 Claims, 12 Drawing Sheets

(56) References Cited

OTHER PUBLICATIONS

"International Search Report & Written Opinion Issued in PCT Application No. PCT/US21/022450", dated Jun. 18, 2021, 13 Pages.
"Final Office Action Issued in U.S. Appl. No. 16/360,008", dated Oct. 5, 2020. 32 Pages.
"Non Final Office Action Issued in U.S. Appl. No. 16/396,686", dated Oct. 19, 2020, 23 Pages.
Non-final Office Action Issued in U.S. Appl. No. 16/360,008, dated Jun. 19, 2020, 33 Pages.
Asaduzzaman et al., "Exploring API Method Parameter Recommendations", In Proceedings of IEEE International Conference on Software Maintenance and Evolution, Sep. 29, 2015, 10 Pages.
"International Search Report and Written Opinion Issued in PCT Application No. PCT/US2020/015984", dated May 25, 2020, 10 Pages.
Zhang et al., "Automatic Parameter Recommendation for Practical API Usage", In Proceedings of the 34th International Conference on Software Engineering, Jun. 2, 2012, pp. 826-836.
Proksch, et al., "Intelligent Code Completion with Bayesian Networks", In Proceedings of the ACM Transactions on Software Engineering and Methodology, vol. 25, Issue 1, Dec. 2015, 31 Pages.
Raychev, Veselin, et al.,"Code Completion with Statistical Language Models", In Proceedings of ACM SIGPLAN Conference on Programming Language Design and Implementation, Jun. 9, 2014, pp. 419-428.
"Notice of Allowance Issued in U.S. Appl. No. 16/360,008", dated Dec. 28, 2020, 18 Pages.

* cited by examiner

```
12  private static void DirectoryCopy(string sourceDirName, string destDirName, bool copySubDirs)
13  {
14      DirectoryInfo dir = new DirectoryInfo(sourceDirName);
15
16      if (!dir.|
```

[Exists]

*FIG. 5A*

```
12  private static void DirectoryCopy(string sourceDirName, string destDirName, bool copySubDirs)
13  {
14      DirectoryInfo dir = new DirectoryInfo(sourceDirName);
15
16      if (!dir.|
```

* Exists
Attributes
Create
CreateSubDirectory
CreationTime
CreationTimeUtc
Delete

```
"dictionary": {
  "2766 2299": {
    "2708701790": [
      "396404896"
    ],
    "3592078170": [
      "396409234",
      "189328903"
    ],
    ...
    "1593478170": [
      "2493478170",
      "2493435670"
    ],
    "1234567034": [
      "0987623455"
    ]
  }
}
```

800

802 — *HASH(CLASS 1)*
804 — *HASH(N)*
806 — HASH(METHOD A)
808 — HASH(N ~ CLASS1.METHOD A)
810 — HASH(METHOD AA)
812 — HASH(METHOD DD)
814 — HASH(N ~ CLASS2.METHOD A)
816 — HASH(METHOD A)
818 — HASH(CLASS1.METHOD A ~ CLASS1.METHOD B)
820 — HASH(METHOD A1)
824 — HASH(CLASS2.METHOD A ~ CLASS3.METHOD B)
828 — HASH(METHOD A12)
830 — HASH(METHOD D16)
832 — HASH(METHOD A22)
834 — HASH(METHOD D26)
836, 838

US 11,243,750 B2

CODE COMPLETION WITH MACHINE LEARNING

CROSS-REFERENCE TO RELATED APPLICATIONS

This application is a continuation-in-part of U.S. patent application Ser. No. 15/939,742, filed on Mar. 29, 2018, which claims the benefit of U.S. Provisional Patent Application No. 62/619,806, filed on Jan. 21, 2018.

BACKGROUND

Software development environments are often used to aid software developers (i.e., users, programmers, etc.) to develop program code. The software development environment may include a source code editor and other tools that the developers utilize to write and test their programs. Some software development environments provide assistance for the developer to write code by automatically presenting a list of possible candidates based on one or more characters (e.g., letters, symbols, etc.) that a developer has typed into a source code editor. A popup menu may appear with several suggested code elements, phrases, or entities that the developer may utilize. This assistance is beneficial since it speeds up the development time and reduces common errors, such as typos. However, the automatic code completion feature may be problematic when there is a large list of candidates which may not be relevant and/or which may be too lengthy for a developer to browse through to find the right element.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion tool utilizes sequential machine learning models to predict more accurately those methods more likely to complete a method invocation. The machine learning models are trained on usage patterns found in commonly-used source code programs. The usage patterns are detected from the characteristics of the context in which a method invocation is used in a program. These characteristics are extracted from data structures representing the syntactic structure and semantic model representations of a program. A machine learning model is generated for each class and contains ordered sequences of method invocations with probabilities representing the likelihood of a transition from a particular method invocation sequence to a succeeding method invocation. In one aspect, the machine learning model is an n-order Markov chain model which is used to predict what method will be used in a current invocation based on preceding method invocations of the same class in the same document and the context in which the current method invocation is made.

During code development, an autocompletion component of a source code editor uses the sequential machine learning models to generate candidates to complete a method invocation. The machine learning model uses one or more immediately preceding method invocations and the characteristics of the context of the current position to predict the more likely methods to complete a method invocation.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 5A-5B illustrate exemplary pop-up windows including code completion candidates.

FIG. 8 is an exemplary illustration of a configuration of a hash-based dictionary including models of multiple classes.

DETAILED DESCRIPTION

Overview

The subject matter disclosed pertains to a mechanism for generating candidates for code completion or autocompletion of a method invocation. A method invocation is the issuance of a call to a method or property of a class. A class may include a large number of methods and/or properties thereby making it impractical to list all the methods and properties of a class as candidates. In order to generate candidates more likely to complete a source code statement invoking a method, the context in which the method is invoked is used to predict the more likely candidates.

Method invocations differ with respect to the context in which they are used in a program. The context of a method invocation may include one or more of the following: the spatial position of the method call in the program; whether the method call is inside a conditional branch (e.g., if-then-else program construct); the name of the class; the name of the method or property invoked; the name of the class corresponding to the invoked method; the function containing the method invocation; the type of the method; and an indication if the method is associated with an override, static, virtual, definition, abstract, and/or sealed keyword. This context information is collected from various programs and used to detect sequential patterns in the method invocations of a class. The context information is used as the features that train a machine learning model to predict the next method to complete a method invocation.

In one aspect, an n-order Markov chain model is generated based on the context information extracted from method invocations found in various programs written in a specific programming language. Markov chain models are used in code completion to predict what method will be used in a current invocation based on preceding method invocations of the same class in the same document and the context in which the current method invocation is made.

Attention now turns to a further discussion of the system, devices, components, and methods utilized in a code completion system.

Machine Learning Code Completion System

Figure 1:
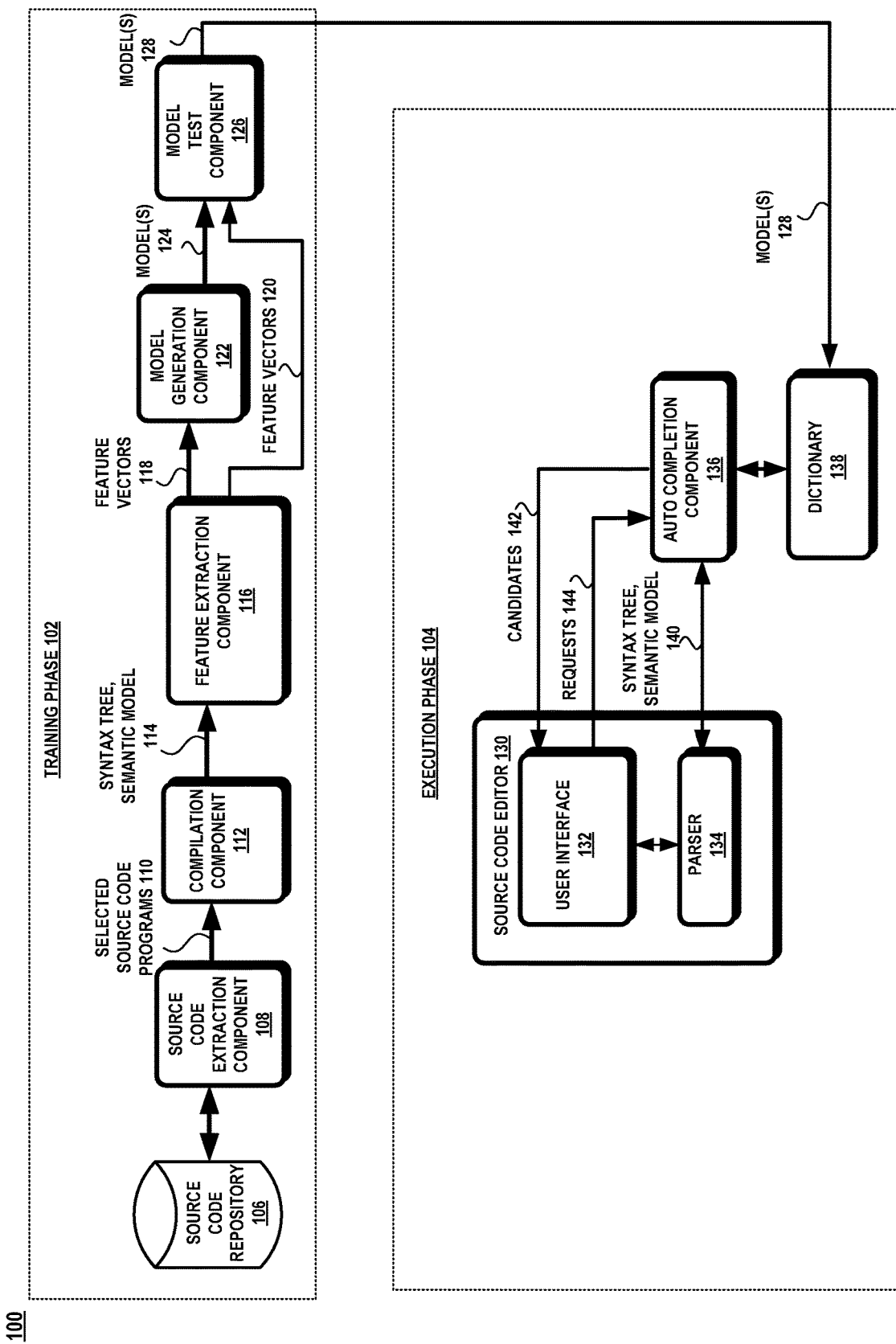
FIG. 1 illustrates an exemplary system including a training phase used to generate machine learning models for code completion and an execution phase that uses the machine learning models for code completion.

FIG. 1 illustrates a block diagram of an exemplary system 100 in which various aspects of the invention may be practiced. As shown in FIG. 1, system 100 includes a training phase 102 which generates a model for each class and an execution phase 104 that utilizes the class models in a code completion system. The training phase 102 may utilize a source code extraction component 108, a compilation component 112, a feature extraction component 116, a model generation component 122 and a model test component 126. The execution phase 104 may utilize a source code editor 130, an auto completion component 136, and a dictionary 138.

In the training phase 102, the source code extraction component 108 extracts source code programs 110 from a source code repository 106 to train the machine learning models. A compilation component 112 compiles the selected source code programs 110 to generate a corresponding syntax tree and semantic model 114. In one aspect, the compilation component 112 may be a front-end compiler, a parser, or a language compiler.

A syntax tree or abstract syntax tree represents the syntactic structure of the program in a hierarchical or tree structure. The syntax tree is a data structure that includes nodes that represent a construct in the grammar of the programming language of the program. The semantic model includes all the semantic information about the program. The semantic model includes information on the symbols referenced at a specific location in the program. Every namespace, type, method, property, field, event, parameter, label, and local variable maybe represented by a symbol. Symbols may also include additional information that a compiler determines from the program, such as methods and properties associated with the symbol. The semantic model encapsulates all this data into a data structure referred to as the semantic model.

The syntax tree and the semantic model 114 of each selected source code program is passed to the feature extraction component 116. The feature extraction component 116 extracts certain features of a method invocation from the syntax tree and semantic model. A feature is a discriminable characteristic of the method invocation that represents the context in which a method is called. There are several features extracted for each method invocation and these features comprise a feature vector. A portion of the feature vectors generated for a particular class can then be used as training data for the model generation component 112 to train a model 118. Another portion of the feature vectors 120 can be used by the model test component 126 to test the model 120.

In one aspect, the features may include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords.

The models 128 may then be used in code completion. The execution phase 104 may include a source code editor 130 having a user interface 132 and a parser 134, an auto completion component 136, and one or more dictionaries 138. In one or more aspects, code completion may be a function or feature integrated into a source code editor and/or integrated development environment (IDE). Code completion may be embodied as a tool or feature that can be an add-on, plug-in, extension and/or component of a source code editor and/or IDE.

In one aspect, a source code editor 130 may include a user interface 132 and a parser 134. The user interface 132 includes a set of features or functions for writing and editing a source code program. The user interface 132 may utilize a pop-up window to present a list of possible candidates for completion thereby allowing a developer to browse through the candidates and to select one from the list. In this manner, code completion serves as documentation for the method invocations associated with a class in addition to being an assistance to writing code quickly. The parser 134 reads the source code in the source code editor 130 and generates a corresponding syntax tree and semantic model 140. The parser 134 also updates the syntax tree and semantic model 140 as the developer creates and edits the source code in the source code editor 130.

At certain points in the editing process, the user interface 132 will detect that the user has entered a particular character which will initiate code completion. In one aspect, the character that initiates code completion may be a period, ".", placed after a class name. The user interface 132 will then request candidates from the auto completion component 136 to present to the developer.

The auto completion component 136 receives requests 144 for candidates to complete a method invocation. The auto completion component 136 extracts the previous method invocations for the same class in the same document used in the current invocation and the context of the current invocation by accessing the syntax tree and semantic model representation of the source code program in the source code editor.

The auto completion component 136 utilizes one or more dictionaries 138 which contain the models 128 in a lookup table format. There is one model for each class. A dictionary 138 corresponding to the class name is accessed based on a sequence of method invocations. The corresponding entry has a list of methods ranked by their predicted probabilities. The auto completion component 136 obtains one or more candidates 142 from the dictionary 138 which are returned back to the user interface 132. In one aspect, at most five candidates are obtained from the dictionary 138. The user interface 132 in turn provides the candidates to the developer. In one aspect, the user interface 132 may provide the candidates from the auto completion component with other candidates from other code completion tools and/or provide the candidates from the machine learning based auto completion component separately. The techniques describe herein are not constrained to any particular mechanism for providing the candidates to a developer and the manner in which the candidates are displayed to the user (e.g., pop-up window, etc.).

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the execution phase 104 may be executed in the same computing environment or in a separate computing environment. The various computing environment is described in further detail below.

Figure 2A:
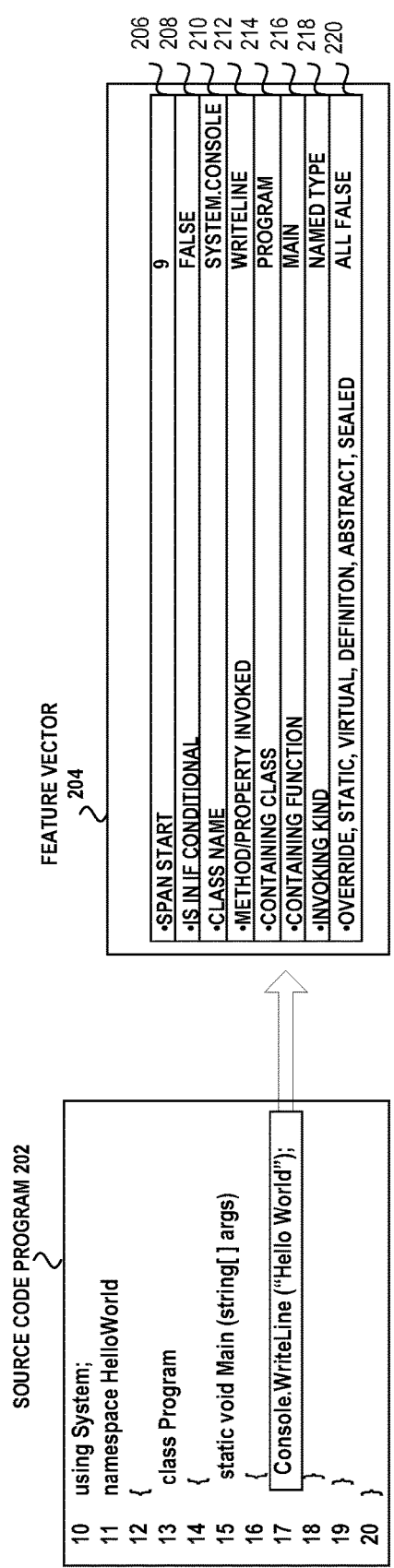
FIG. 2A is a schematic diagram illustrating the extraction of features from a source code program.

FIG. 2A illustrates the extraction of the features used to train a Markov chain model. Source code program 202 contains at line 17 an invocation of the method Console.Writeline( ). The Console.Writeline method is part of the System.Console class. The features that are extracted from this method invocation are placed into feature vector 204. Feature vector 204 includes the following features: span start=9 (206); if conditional=false (208); class name=System.Console (210); the name of the method=Writeline (212); the name of the class containing the method=Program (214); the name of the function containing the method invocation=Main (216); the type of the method=Named Type (218); and if the method is associated with the keywords override, static, virtual, definition, abstract, and sealed=False (220).

Feature vector 204 as well as other feature vectors associated with method invocations of the System.Console class are used to train a model to predict the most likely candidates to complete the method invocation. The model is a sequential or chain model that is capable of modeling sequences of events. In one aspect, the model is a Markov chain model. A Markov chain model relies on the assumption that each state is dependent on previous states. The dependency is given by a conditional probability $P(x_t|x_{t-1}, \ldots, x_{t-N})$, where $x_t$ is the state of the model at time t and n is the order of the Markov chain. In a first order Markov chain, a state is dependent only on the immediately preceding state and in a second order Markov chain model, a state is dependent on the immediately preceding two states.

The transition probabilities are generated from the sequential usage patterns detected in the training data. In one aspect, the probabilities may be computed as $P(x_t|x_{t-1}, \ldots, x_{t-n})=N_t/N_{total}$, where n is the order of the Markov chain, $N_t$ is the number of times $x_t$ comes after $x_{t-1}$ and $x_{t-2}$, $N_{total}$=total number of methods that come after $x_{t-1}$ and $x_{t-2}$. Each model represents a particular class and contains sequences of method invocations that result in an end state that represents a method invocation within the class.

Figure 2B:
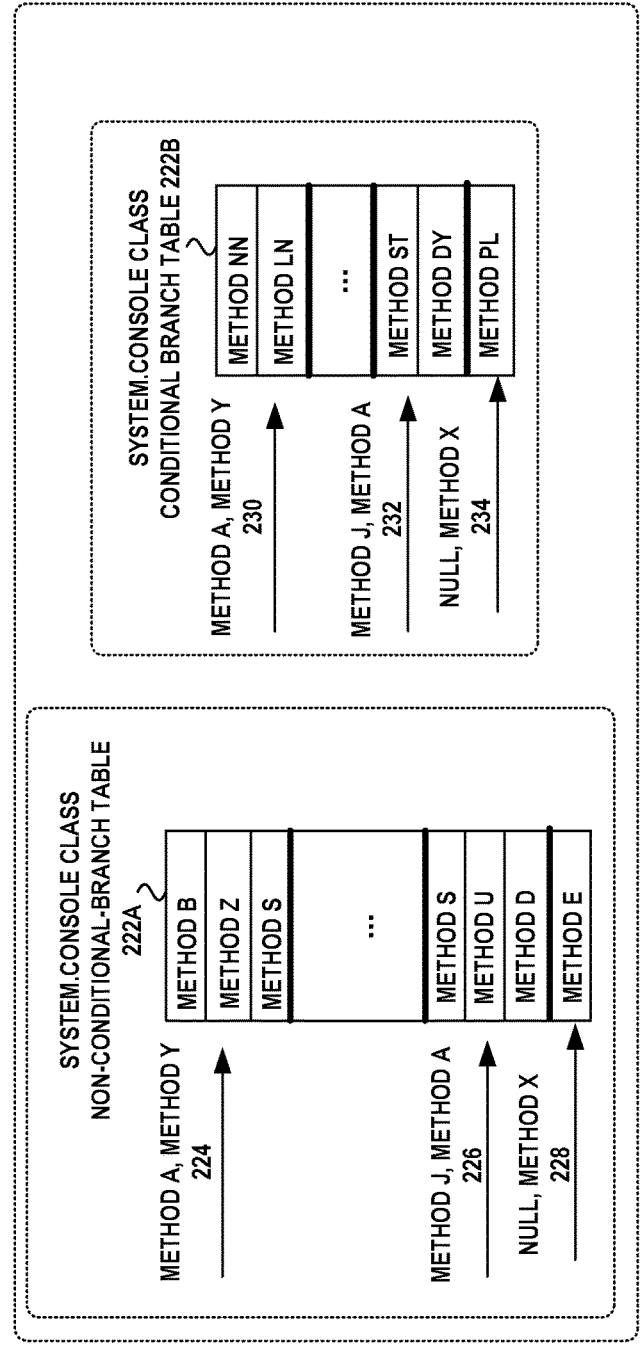
FIG. 2B illustrates an exemplary second-order Markov model embodied in a lookup table or dictionary format.

FIG. 2B illustrates an exemplary second order Markov chain model embodied as a lookup table (i.e., dictionary, key-value pair). In one aspect, there are at least two lookup tables for each class 222A, 222B. One lookup table is for method invocations outside of a conditional branch 222A and the other lookup table is for method invocations within a conditional branch 222B. The key into either table is a method invocation sequence of two previous method invocations in the System.Console class. The corresponding entry in the table is a list of methods in the System.Console class ranked in order of highest probability for completing a current invocation.

As shown in FIG. 2B, when the sequence of preceding method invocations of the System.Console class are Method A followed by Method Y 224, the key into the table is the sequence Method A, Method Y. The corresponding entry in the table 222A lists the code completion candidates as Method B, Method Z, Method S, ordered in highest probability to lowest probability. Likewise, when the preceding method invocations of the System.Console class are Method J followed by Method A 226, the code completion candidates are Method S, Method U, and Method D. When there is only one preceding method invocation for a class in a document, a null value is used to represent the missing method invocation and the key is the method sequence NULL, Method X. The corresponding entry is Method E.

When the current invocation is inside a conditional branch (i.e., if-then-else statement), then the System.Console class conditional branch table 222B is used. The previous sequence of method invocations for the System.Console class in the same document is used as the key into this table. When the preceding sequence of method invocations is Method A followed by Method Y 224, then the code completion candidates are Method NN and Method LN, where Method NN has a higher probability then Method LN. Likewise, when the preceding sequence of method invocations is Method J followed by Method A 226, the code completion candidate is Method ST. When there is only one preceding method invocation, the key is the sequence NULL, Method X 228 and the candidate is Method PL.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
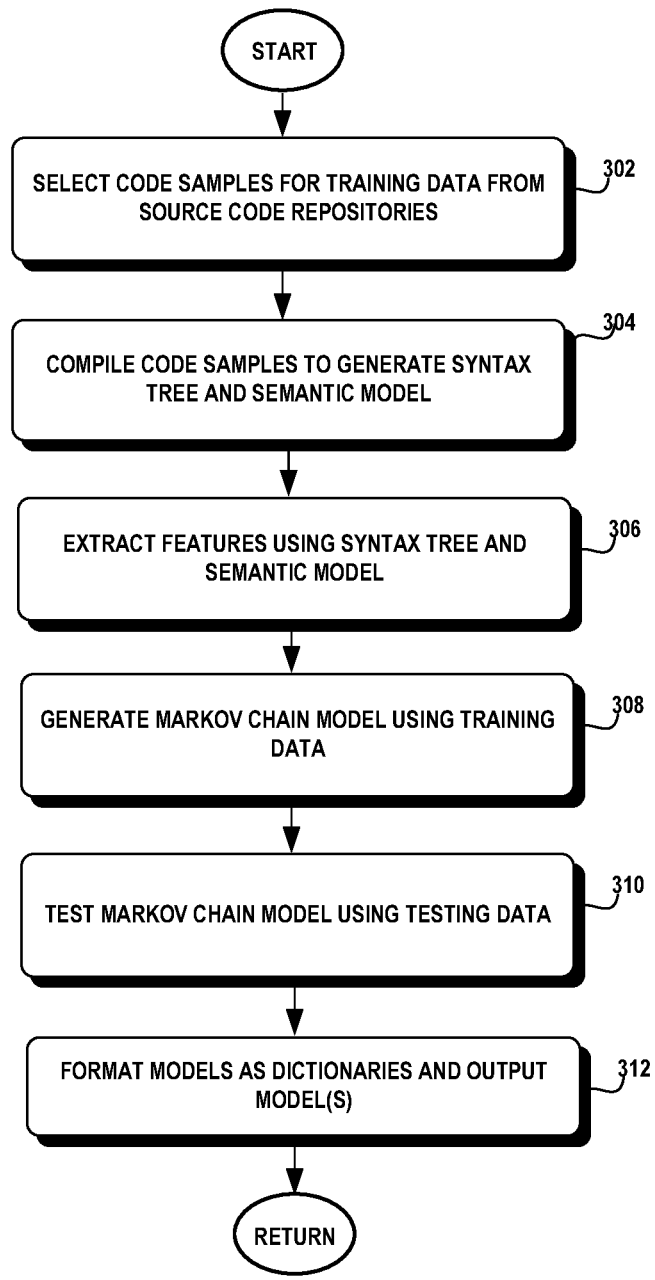
FIG. 3 is a flow diagram illustrating an exemplary method for generating the machine learning models.

FIG. 3 illustrates an exemplary method illustrating the generation of the machine learning models for code completion. Referring to FIGS. 1 and 3, one or more source code repositories 106 are searched for source code programs written in a target programming language. The source code repositories 106 can be widely-used code repositories, such as GitHub, internal code repositories, and/or combinations thereof. The source code extraction component 108 extracts a number and type of source code programs that meet an intended target, such as source code programs that are accessed frequently, source code programs that utilize a particular function (e.g., database operations, computer graphics programs, etc.), and the like (collectively, block 302).

The selected source code programs 110 are then compiled by the compilation component 112 to produce data structures representing the syntax tree and semantic model of the source code (block 304). The syntax tree and semantic model 114 are used by the feature extraction component 116 to extract characteristics representative of the context of a method invocation. These characteristics are used to determine the order in which methods are invoked in a program having conditional branches (block 306). The characteristics include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords.

The characteristics are configured into feature vectors which serve as the training and testing data for the models. In one aspect, the feature vector can be split with 80% used as training data and 20% used as testing data (collectively, block 306).

The feature vectors in the training data are used by the model generation component to generate the models. The data in the feature vectors is used to determine an order of the method invocations in each program for each class. From the ordered list of method invocations, sequences of usage patterns can be detected. These patterns can then be partitioned into sequences having n+1 states, where n is the order of the Markov chain model. These sequences are then used to train a Markov chain model for each class which entails generating the states and transition probabilities (collectively, block 308).

The training data is analyzed to detect sequences of method invocations for each class. For an n-order Markov chain model, the number of specific n state method invocation sequences that occur is counted to order the n+1 states that occur thereafter by derived probabilities. The derived probability may be generated by the ratio of the number of times the n+1 state sequence occurs over the number of times the n state sequence occurs (block 308).

The models are then tested to ensure a target level of accuracy (block 310). The testing entails providing each model with test data and checking the recommendations that the model outputs. When the recommendations achieve a certain level of accuracy, then the models are transformed into a dictionary or lookup table format and released (block 312).

Figure 4:
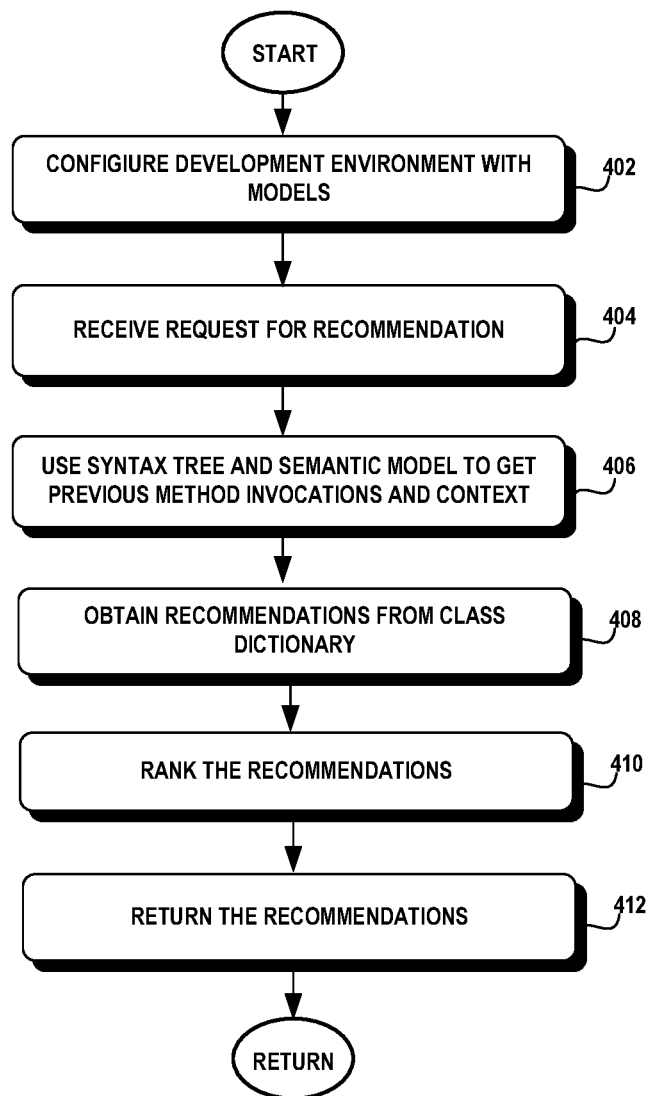
FIG. 4 is a flow diagram illustrating an exemplary method for utilizing the machine models for code completion.

FIG. 4 illustrates an exemplary method of code completion utilizing the machine learning models. Referring to FIGS. 1 and 4, code completion is performed in a development environment such as a source code editor 130. The source code editor 130 is configured to interact with an auto completion component 136 that utilizes the machine learning models in a lookup table format (block 402). The source code editor 130 performs a background parsing process that parses the source code in the source code editor to generate and update the syntax tree and semantic model of the source code (block 402).

The user interface 132 of the source code editor 130 detects the input characters that a developer enters into the source code editor 130. When the user interface 132 detects a particular character that denotes code completion is needed for a method invocation at a current position in the source code editor 130, the user interface 132 requests recommendations 144 from the auto completion component 136 (block 404). In one aspect, the detection of a period after a class name is used as the trigger to invoke code completion (block 404).

The auto completion component 138 utilizes the syntax tree and semantic model 140 generated during the source code editing session to obtain the previous method invocations that have occurred before the current position in the source code editor 130 and the characteristics of the context of the current method invocation, such as whether the current method invocation is inside a conditional branch (block 406). In one aspect, application program interfaces (APIs) may be used to extract the previous method invocations from the syntax tree and semantic model and the characteristics of the context of the current position (block 406).

The auto completion component 136 utilizes the dictionary 138 associated with the class to search for a sequence most likely to predict the next method invocation using the characteristics of the context of the current position (block 408). Once the auto completion component 136 obtains the previous method invocations, an n-state sequence can be constructed and used as a key to access the dictionary. The corresponding values are used as the recommendations. If there is no such n-state sequence, then the dictionary is searched using an n−1 state sequence constructed from the previous n−1 method invocations in the same class. If the n−1 state sequence cannot be found in the dictionary, then the n−2 state sequence is used to search the dictionary. In an n-order Markov chain model, the n−1 state sequence will be stored as a new n state sequence with the first state marked as null.

The auto completion component 136 may find one or more candidates for recommendation from the sequences in the dictionary (block 408). In the event that there are multiple candidates, the auto completion component 136 orders the recommendations by highest probability (block 410). The candidates are then returned to the user interface for display to the developer (block 412).

FIGS. 5A-5B illustrate exemplary user interfaces. FIG. 5A shows an exemplary source code program 502 in a source code editor that display pop-up window 504 containing candidates for code completion. As shown in FIG. 5A, the suggested method to complete the expression !dir. is the method Exists. FIG. 5B shows an exemplary source code program 506 in a source code editor that displays pop-up window 508 containing multiple recommendations. The recommendation from the auto completion component may be distinguished with a star * and other recommendations are included thereafter in alphabetical order.

Cross-Class Model System

Attention now turns to a discussion of cross-class models for code completion. In the cross-class model aspect, candidates to complete the method name in a partially-formed method invocation are recommended based on the sequence of n preceding method invocations regardless of the method's class. A model is generated for each class in a programming language and used in a code completion system to predict the method name that is likely to complete a current partially-completed method invocation based on the preceding sequence of method invocations regardless of the class of the preceding method invocations. An ordered sequence of method invocations is not constrained to the class at the marker character and may include a sequence of method invocations from different classes. A partially-formed method invocation is one which only contains a class name without the method name or complete method signature.

A method in an object-oriented programming language is a function or procedure associated with an object class. An object is made up of a behavior and data. Data is represented as properties of the object and the behavior as the methods. Methods are an interface an object presents to the outside world. A method also includes an application programming interface (API).

In one aspect, an n-order Markov chain model is generated for each class based on the context information extracted from method invocations found in various programs written in a specific programming language. There are two models for each class. One model represents the methods of a class that are invoked within a conditional branch and another model represents the methods of a class that are invoked outside of a conditional branch. The preceding method sequences can include methods of the same class, methods of different classes, or no method. A cold-start method represents the most frequently-used method of a class and is used when none of the preceding method sequences are represented in the model.

The models for multiple classes of a programming language are aggregated into a dictionary with each model containing hashed indices and hashed values. A hashed value represents a method name likely to complete the partially-formed method invocation. The hashed values are ranked in order of descending probability. The indices and values are hashed in order to reduce the size of the dictionary due to the increased number of sequences used in each model.

Figure 7:
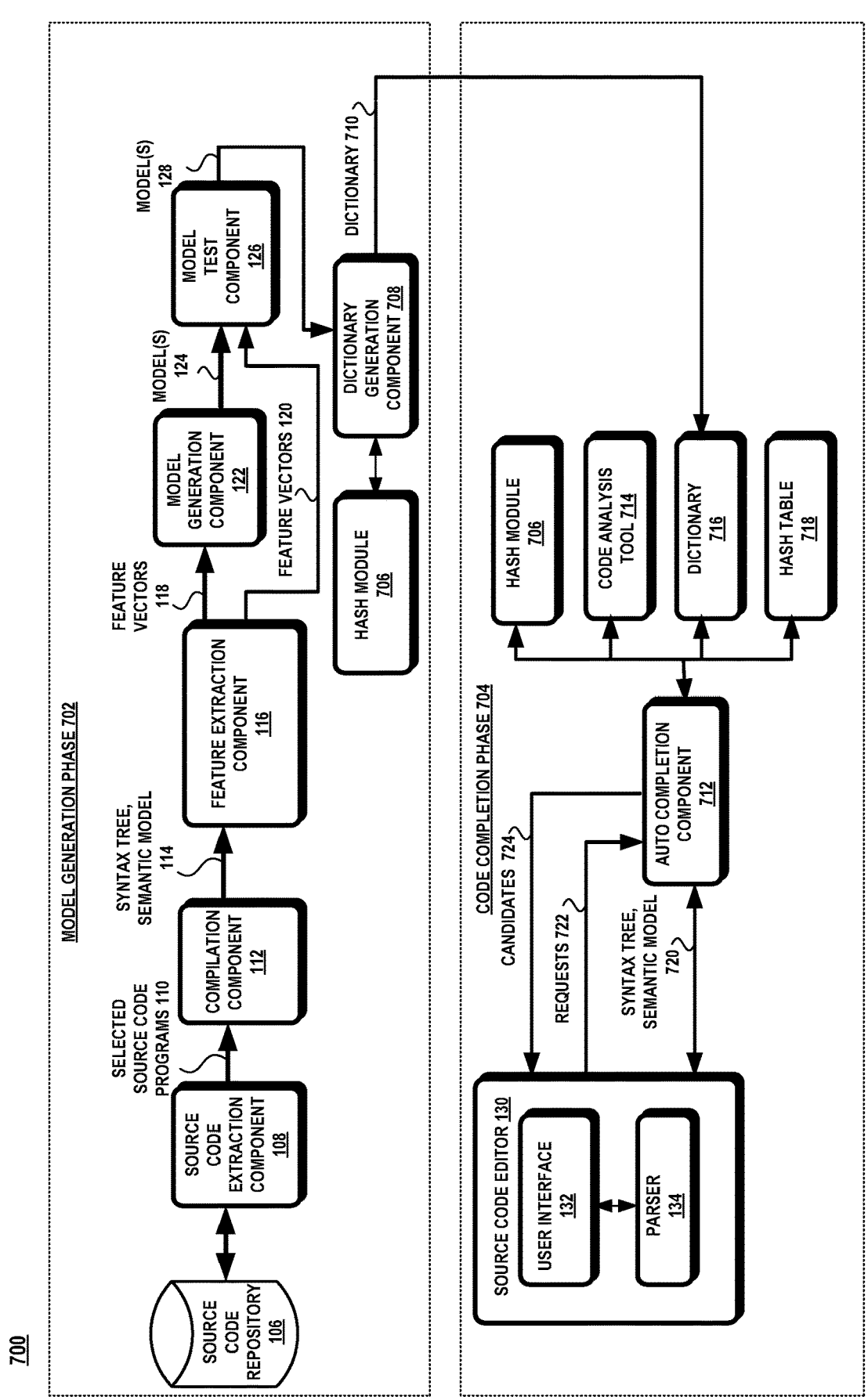
FIG. 7 illustrates an exemplary system for training machine learning models to predict a method for completion of a partially-formed method invocation and a code completion phase that uses the models to predict candidates likely to complete the partially-formed method invocation.

FIG. 7 illustrates a block diagram of an exemplary system 700 in which various aspects of the invention may be practiced. As shown in FIG. 7, system 700 includes a model generation phase 702 where a model for each class is generated from historical usage data and a code completion phase 704 that utilizes the class models in a code completion system. The model generation phase 702 utilizes a source code extraction component 108, a compilation component 112, a feature extraction component 116, a model generation component 122, a model test component 126, a hash module 706 and a dictionary generation component 708.

In the model generation phase 702, the source code extraction component 108 extracts source code programs 110 from a source code repository 106 to train the machine learning models. A compilation component 112 compiles the selected source code programs 110 to generate a corresponding syntax tree and semantic model 114 of each of the selected source code programs. The source code programs use the same programming language. In one aspect, the compilation component 112 may be a front-end compiler, a parser, or a language compiler.

A syntax tree or abstract syntax tree represents the syntactic structure of the program in a hierarchical or tree structure. The syntax tree is a data structure that includes nodes that represent a construct in the grammar of the programming language of the program. The semantic model includes all the semantic information about the program. The semantic model includes information on the symbols referenced at a specific location in the program. Every namespace, type, method, property, field, event, parameter, label, and local variable maybe represented by a symbol. Symbols may also include additional information that a compiler determines from the program, such as methods and properties associated with the symbol. The semantic model encapsulates all this data into a data structure referred to as the semantic model.

The syntax tree and the semantic model 114 of each selected source code program is passed to the feature extraction component 116. The feature extraction component 116 extracts certain features of a method invocation from the syntax tree and semantic model. A feature is a discriminable characteristic of the method invocation that represents the context in which a method is called. There are several features extracted for each method invocation and these features comprise a feature vector. A portion of the feature vectors generated for a particular class can then be used as training data for the model generation component 112 to train a model 118. Another portion of the feature vectors 120 can be used by the model test component 126 to test the model 120.

In one aspect, the features may include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords.

The model generation component 122 uses a portion of the feature vectors 118 to train a model for each class and the model test component 126 uses another portion of the feature vectors 120 to test each model. The dictionary generation component 708 aggregates the models 128 into a dictionary where each sequence and method name are represented by a hash value generated by the hash module 706.

The code completion phase 704 may utilize a source code editor 130 having a user interface 132 and a parser 134, an auto completion component 712, the hash module 706, a code analysis tool 714, a hash table 718, and a dictionary 716. In one or more aspects, code completion may be a function or feature integrated into a source code editor and/or integrated development environment (IDE). Code completion may be embodied as a tool or feature that can be an add-on, plug-in, extension and/or component of a source code editor and/or IDE. Alternatively, the code completion may be part of a web service that supports an online editor, such as the Microsoft® try.dot.net.

In one aspect, a source code editor 130 may include a user interface 132 and a parser 134. The user interface 132 includes a set of features or functions for writing and editing a source code program. The user interface 132 may utilize a pop-up window to present a list of possible candidates 724 for completion thereby allowing a developer to browse through the candidates 724 and to select one from the list. In this manner, code completion serves as documentation for the method invocations associated with a class in addition to being an assistance to writing code quickly. The parser 134 reads the source code in the source code editor 130 and generates a corresponding syntax tree and semantic model 720. The parser 134 also updates the syntax tree and semantic model 720 as the developer creates and edits the source code in the source code editor 130.

At certain points in the editing process, the user interface 132 will detect that the user has entered a particular character which will initiate code completion. In one aspect, the character that initiates code completion may be a period, ".", placed after a class name. The user interface 132 will then request candidates 722 from the auto completion component 712 to present to the developer.

The auto completion component 712 receives the requests for candidates 724 to complete a method invocation. The auto completion component 712 extracts the previous method invocations in the same document used in the current invocation and the context of the current invocation by accessing the syntax tree and semantic model representation of the source code program in the source code editor 130.

The auto completion component 712 uses the hash module 706 to generate a hash value for the class name of the current partially-formed method invocation and obtains from the code analysis tool 714 a list of the methods for the class. The code analysis tool 714 may be a compiler and/or set of code analysis APIs having the capability to produce the methods of a class. The auto completion component 712 generates a hash table 718 for the class containing a hashed value of each method and its un-hashed method name.

The dictionary 716 contains the models in a hash-based lookup table. The hashed value of a class is used to obtain the model corresponding to a class. Each class model includes a portion for a conditional branch model and a portion for a non-conditional branch model. The entry of each model is accessed based on an ordered sequence of n immediately preceding method invocations. The hashed values associated with each entry represent a list of methods ranked in descending order of probability. The probability is generated by the model generation component 122 and indicates the likelihood of a method name completing the partially-formed method invocation. The auto completion component 712 obtains one or more hashed values of candidates from the dictionary 716 and searches the hash table 718 to obtain the un-hashed method name of each candidate. The candidates 724 are returned back to the user interface 132. In one aspect, at most five candidates are obtained from the dictionary 716.

The user interface 132 in turn provides the candidates 724 to the developer. In one aspect, the user interface 132 may provide the candidates from the auto completion component 712 with other candidates from other code completion tools and/or provide the candidates from the machine learning based auto completion component separately. The techniques describe herein are not constrained to any particular mechanism for providing the candidates to a developer and the manner in which the candidates are displayed to the user (e.g., pop-up window, etc.).

It should be noted that FIG. 7 shows components of the system in one aspect of an environment in which various aspects of the invention may be practiced. However, the exact configuration of the components shown in FIG. 7 may not be required to practice the various aspects and variations in the configuration shown in FIG. 7 and the type of components may be made without departing from the spirit or scope of the invention. For example, the model generation phase 702 may be executed in one computing environment and the code completion phase 704 may be executed in the same computing environment or in a separate computing environment. The various computing environments are described in further detail below.

Attention now turns to an illustration of an exemplary dictionary. Turning to FIG. 8, there is shown an exemplary configuration of the hash-based dictionary 800 and a hash-based dictionary implemented as a JavaScript Object Notation (JSON) file 832. Dictionary 800 contains one model for each class. The model contains a portion for method invocations that are used within a conditional branch and another portion is for the method invocations that are used outside of a conditional branch. Model 802 represents the method candidates for class1. A portion 836 of table 824 represents method candidates that are used outside of a conditional branch and another portion 838 represents method candidates of class1 that are used within a conditional branch.

Within each model, there is an entry for each of the trained method sequences. For example, in the model of class1, there is an entry 806 for the cold-start method 804 (Hash(N)), two entries 810, 812 for a sequence only having a single preceding method invocation from the same class 808 (Hash(N~Class1.MethodA), an entry 820 for a single preceding method invocation from a different class 814 (Hash(N~Class2.MethodA), four entries 828, 830, 832, 834 for a sequence of two preceding method invocations of the same class 818 (Hash(Class1.MethodA~Class1.MethodB), and an entry for a sequence of two preceding method invocations of different classes 824 (Hash (Class2.MethodA~Class3.MethodB)).

Dictionary 832 is a compact representation of the aggregated models. Each index into a respective model and each entry of a model is hashed as well as the candidate methods. In one aspect, the dictionary is implemented as a JSON file of attribute-value pairs. Each attribute and its corresponding value are a hash value.

For example, as shown in dictionary 832, the hash value "27662299" is the index into table of class1. The hash value "2708701790" represents the hash value of the index to the cold-start method 804 and the hash value "396404896" represents the hash value of the code-start method 806. The hash value "3592078170" represents the hash value of the index of the sequence, N~class1.method A, "396409234" represents the hash value of methodAA of class1 810 and "189328903" represents the hash value of methodDD of class1 812. The hash value "1593478170" represents the hash value for the sequence class2.methodA~class3.methodB, 824, the hash value "2493478170" represents method A12, 828, the hash value "2493435670" represents methodD16, 830, the hash value "1234567034" represents methodA22, 832, and the hash value "0987623455" represents methodD26, 834.

Figure 9:
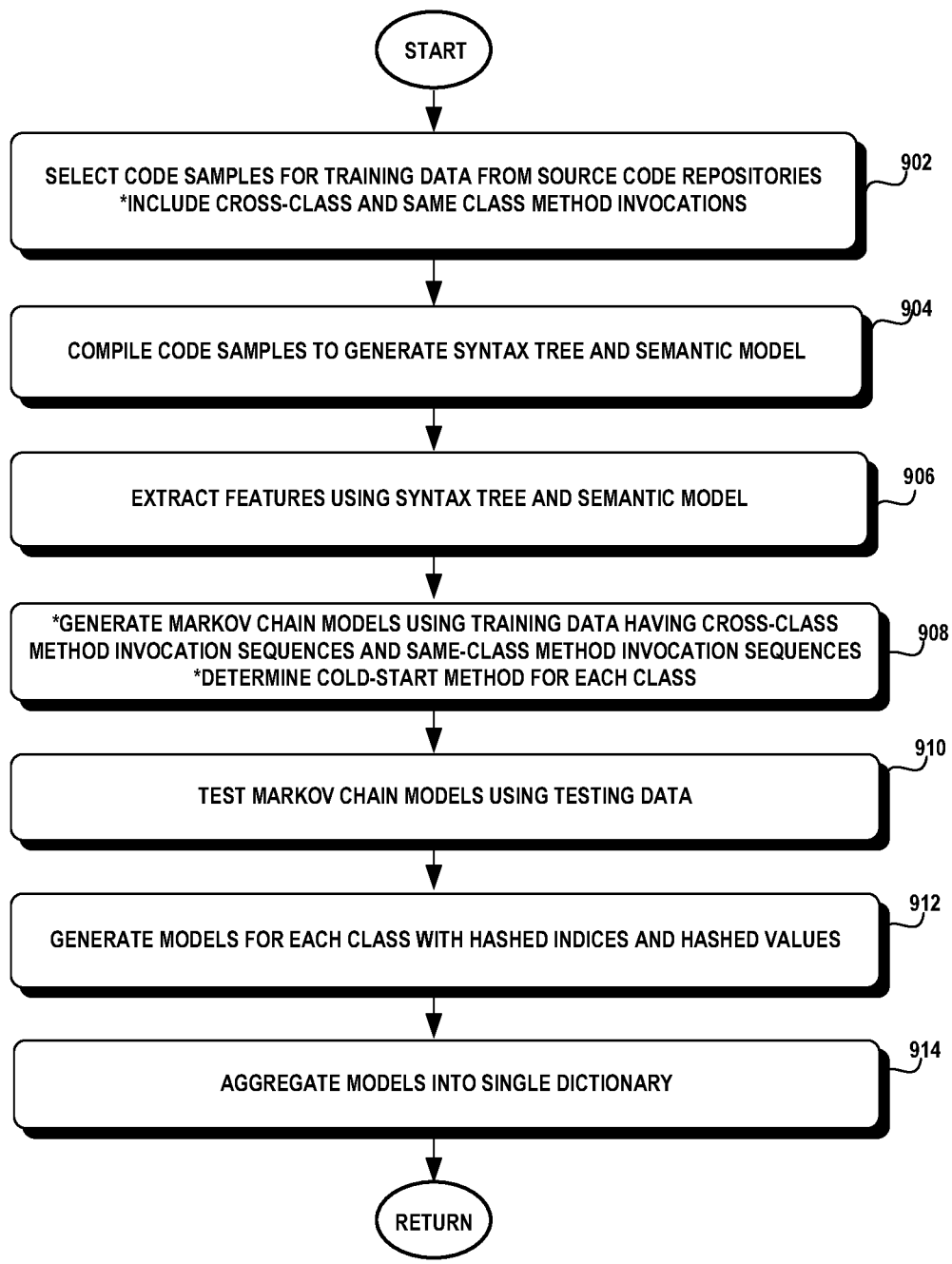
FIG. 9 is a flow diagram illustrating an exemplary method for training cross-class machine learning models.

Attention now turns to a description of the method used to generate the machine learning models of the dictionary. Turning to FIGS. 7 and 9, one or more source code repositories 106 are searched for source code programs written in a target programming language. The source code repositories 106 can be widely-used code repositories, such as GitHub, internal code repositories, and/or combinations thereof. The source code extraction component 108 extracts a number and type of source code programs that meet an intended target, such as source code programs that are accessed frequently, source code programs that utilize a particular function (e.g., database operations, computer graphics programs, etc.), and the like. The source code programs include methods using cross-claim method invocations and methods containing same class method invocations. (Collectively, block 902).

The selected source code programs 110 are then compiled by the compilation component 112 to produce data structures representing the syntax tree and semantic model of the source code (block 904). The syntax tree and semantic model 114 are used by the feature extraction component 116 to extract characteristics representative of the context of a method invocation. These characteristics are used to determine the order in which methods are invoked in a program having conditional branches and non-conditional branches (block 906).

The characteristics include one or more of the following: the position of a method invocation within the program (e.g., span start); whether the method invocation is within a conditional branch (e.g., if-then-else statement, switch or case statement); the class name corresponding to the method invocation, the name of the method or property invoked; the name of the class that contains the called method; the function that contains the called method; the type of the method; and an indication of whether the called method is associated with the static, virtual, override, definition, abstract and/or sealed keywords (block 906).

The feature vectors in the training data are used by the model generation component 122 to generate the models.

The data in the feature vectors is used to determine an order of the method invocations in each method regardless of class. From the ordered list of method invocations, sequences of usage patterns can be detected. These patterns can then be partitioned into sequences having n+1 states, where n is the order of the Markov chain model. These sequences are then used to train a Markov chain model for each class having sequences of same class methods and cross-class methods to generate the states and transition probabilities. (Collectively, block 908).

The training data is analyzed to detect sequences of method invocations for each class. For an n-order Markov chain model, the number of specific n state method invocation sequences that occur is counted to order the n+1 states that occur thereafter by derived probabilities. The derived probability may be generated by the ratio of the number of times the n+1 state sequence occurs over the number of times the n state sequence occurs (Collectively, block 908).

In addition, the cold-start method for each class is determined. The cold-start method is the most frequently-used method of a class. (Collectively, block 908).

The characteristics are configured into feature vectors which serve as the training and testing data for the models. In one aspect, the feature vector can be split with 80% used as training data and 20% used as testing data. (Collectively, block 910).

When the candidate recommendations achieve a certain level of accuracy, then the models are transformed into a hash-based dictionary or lookup table. A hash function is used to generate a hash value for the indices and candidate recommendations in each model. A cryptographic hash function, such as one of the Secure Hash Algorithms (SHA) hash functions may be used. For example, the SHA-1 hash function takes an input and generate a 20-byte hash value known as a message digest that is a 40-digit hexadecimal number. (Collectively, block 912). The hashed models are then aggregated into a single dictionary (block 914).

Figure 10:
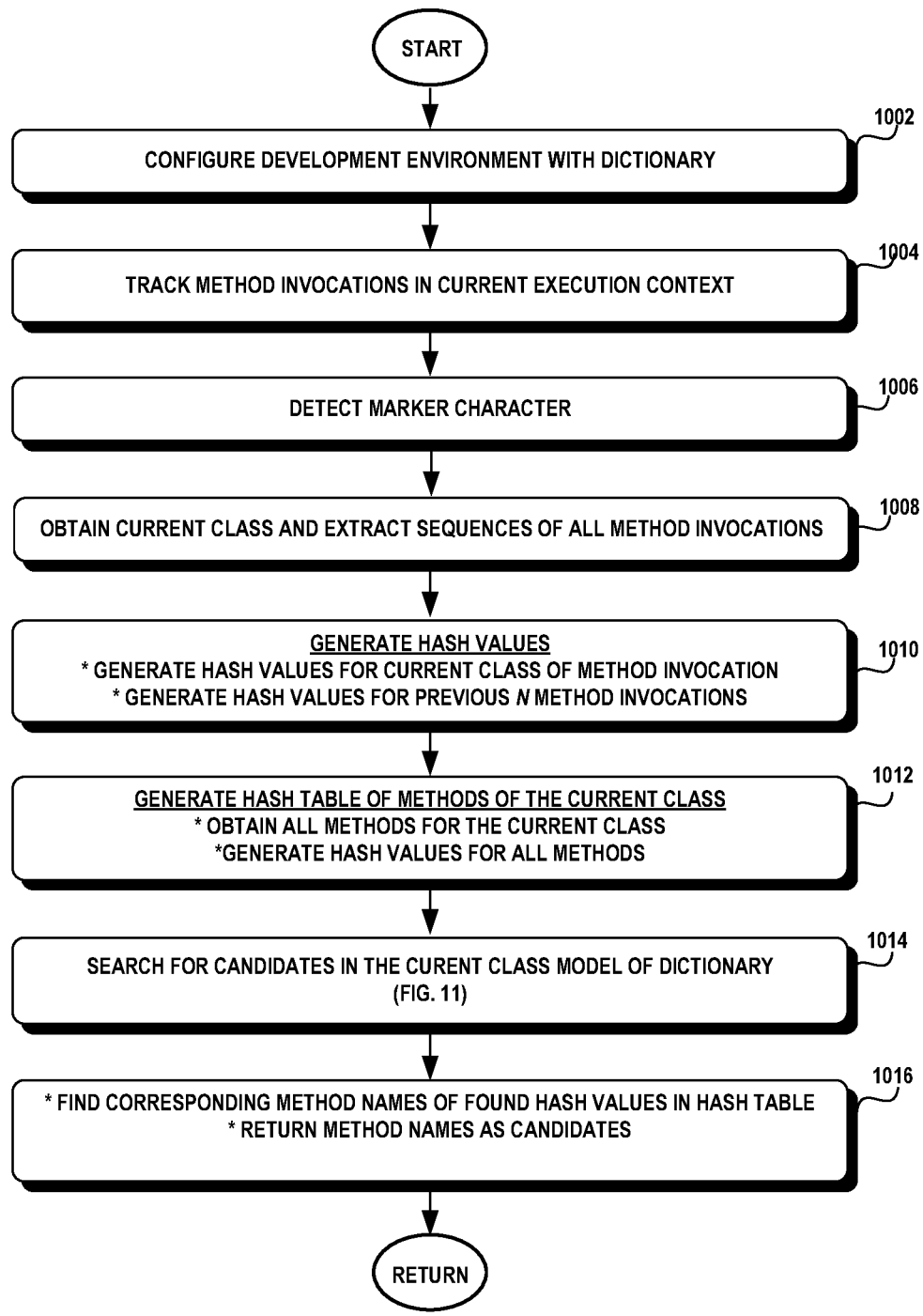
FIG. 10 is a flow diagram illustrating an exemplary method for using the cross-class and same class machine learning models in a code completion system.

FIG. 10 illustrates an exemplary method of code completion utilizing the machine learning models. Referring to FIGS. 7 and 10, code completion is performed in a development environment such as a source code editor 130 or integrated development environment. The source code editor 130 is configured to interact with an auto completion component 712 that utilizes the machine learning models in a dictionary 716. (Collectively, block 1002).

The source code editor 130 engages a background parsing process that tracks the source code in the development environment as the developer is writing the source code. The background parsing process tracks the sequence of method invocations that are contained within each method and updates a syntax tree and semantic model of the developing source code (block 1004).

The user interface 132 of the source code editor 130 detects the input characters that a developer enters into the source code editor 130. When the user interface 132 detects a particular character that denotes code completion is needed for a method invocation at a current position in the source code editor 130, the user interface 132 requests candidates 724 from the auto completion component 712. In one aspect, the detection of a period after a class name is used as the trigger to invoke code completion of a partially-formed method invocation. (Collectively, block 1006).

The auto completion component 712 utilizes the syntax tree and semantic model 720 generated during the source code editing session to obtain the sequence of preceding method invocations before the current position in the source code editor 130 and the characteristics of the context of the current method invocation, such as whether the current method invocation is inside a conditional branch or not. In one aspect, application program interfaces (APIs) may be used to extract the previous method invocations from the syntax tree and semantic model and the characteristics of the context of the current position. The preceding method invocation sequence includes all the method invocations in a method. (Collectively, block 1008).

The auto completion component 712 uses the hash module 706 to generate a hash value of the current class and a hash value for the ordered sequence of n preceding method invocations (block 1010). In addition, the auto completion component 712 obtains from the code analysis tool 714 a list of all the methods of the current class (block 1012). The auto completion component 712 generates a hash table 718 containing an entry for each method in the current class that includes the un-hashed method name and its corresponding hashed value (block 1012).

The auto completion component 712 utilizes the dictionary 716 associated with the class to search for the candidates 724 for the current class (block 1014). The search returns the hashed value of the candidates and the auto completion component 712 searches the hash table 718 to find the corresponding un-hashed method name (block 1016). The method names of the candidates are returned to the user interface in the ranked order (block 1016).

Figure 11:
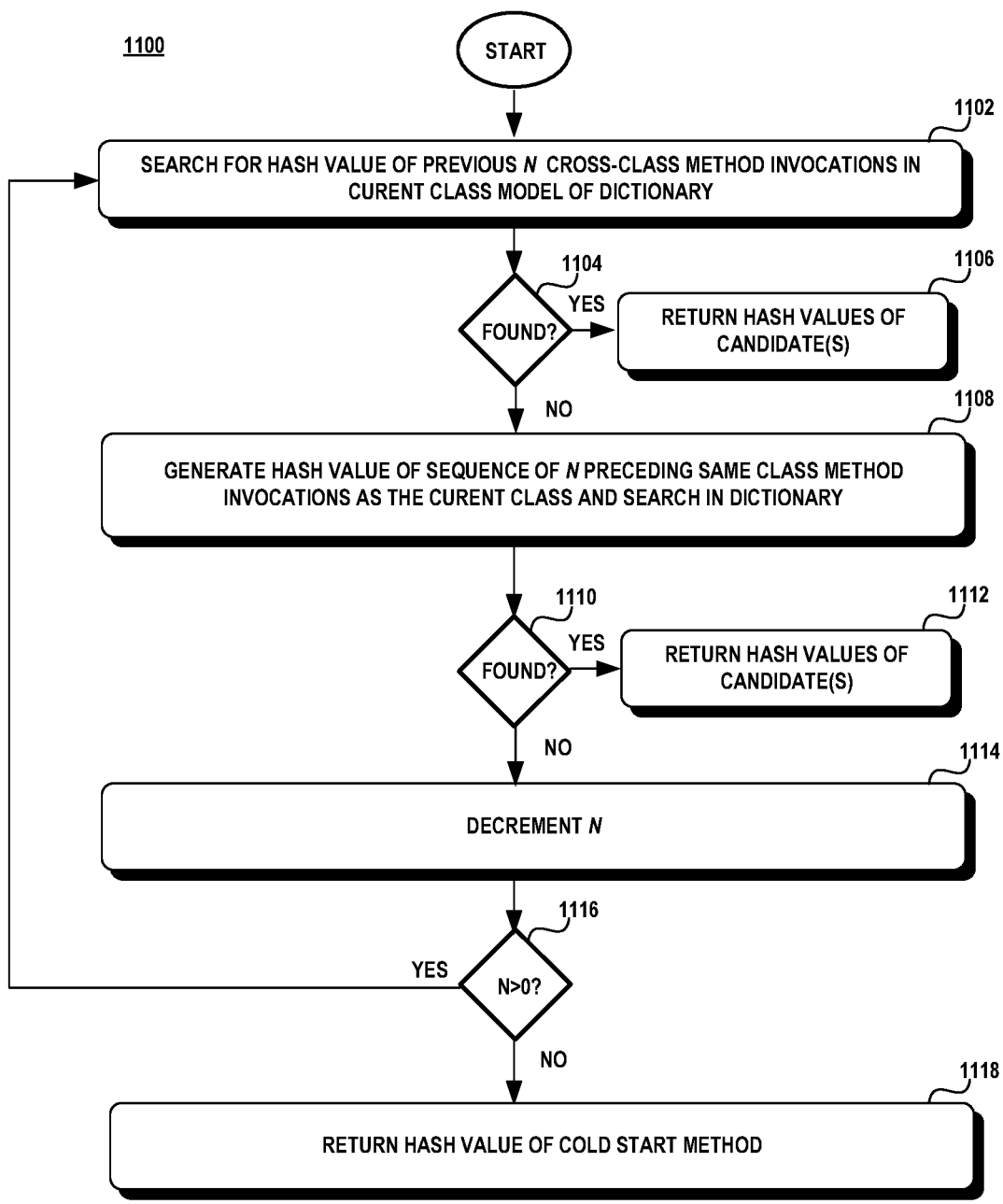
FIG. 11 is a flow diagram illustrating an exemplary method for searching the hash-based dictionary for candidate recommendations.

FIG. 11 illustrates an exemplary method 1100 for searching for candidates to complete a partially-formed method invocation. Turning to FIGS. 7 and 11, the auto completion component 712 searches for the hashed value of the ordered sequence of n immediately preceding method invocations within a method that are from different classes (block 1102). If an entry is found (block 1104—yes), then a threshold number of the hash values of the top ranked candidates is returned (block 1106). If an entry is not found (block 1104—no), then a sequence of the n preceding same class method invocations is generated (block 1108). A hash value is generated for the sequence of n preceding same class method invocations which is used to search the dictionary for candidates (block 1108). If an entry is found (block 1110—yes), then a designated number of hash values of the top ranked candidates is returned (block 1112).

If no entry is found for the sequence of n preceding same class method invocations (block 1110—no), then the number of preceding method invocations, n, is decreased (block 1114) until either a match is found in the dictionary or until no sequence exists, n=0. (block 1116—no). However, the sequence of n−1 preceding method invocations includes cross-class methods and if no match is found, then the sequence is composed of n−1 preceding method invocations of same class methods.

For example, if n=2, and the preceding sequence of n same class method invocations failed to produce any candidates, then the method searches for a sequence of the preceding n−1 cross-class method invocations. If no candidates are found, then the method searches for a sequence of the preceding n−1 same class method invocations. If no candidates are found and n>0 (block 1116—yes), then the value of n is decreased and the process looks for a sequence of n−1 cross-class methods and then a sequence of n−1 same-class methods. The method stops when a candidate is found or n=0. In the case where no match is found and n=0 (block 1116—no), the hash value of the cold start method for the class is returned (block 1118).

TECHNICAL EFFECT

Aspects of the subject matter disclosed herein pertain to the technical problem of providing more precise candidates for code completion. The technical feature associated with addressing this problem involves an n-order Markov chain model that predicts a method for completion of a method invocation. The Markov chain model is trained using sequences of usage patterns of historical method invocations from a sampled population of existing source code programs. Characteristics of the context in which a method is invoked is extracted from the sampled programs in order to recognize sequential patterns in the usage of a method invocation. These characteristics serve as the training data which trains the Markov chain model to more particularly predict a method to complete a method invocation. In this manner, the source code editor presents more relevant candidates for code completion.

Aspects of the subject matter disclosed pertain to the technical problem of providing more precise candidates for code completion regardless of the classes in the sequence of the preceding method invocations that precede a partially-formed method invocation. The technical feature associated with addressing this problem involves an n-order Markov chain model that is agnostic to the classes used in the preceding method invocations. In addition, hashed values are used to represent the model and its predicted candidates in order to constrain the size of the models and to increase the expediency of the time at which the models are accessed.

Exemplary Operating Environment

Figure 6:
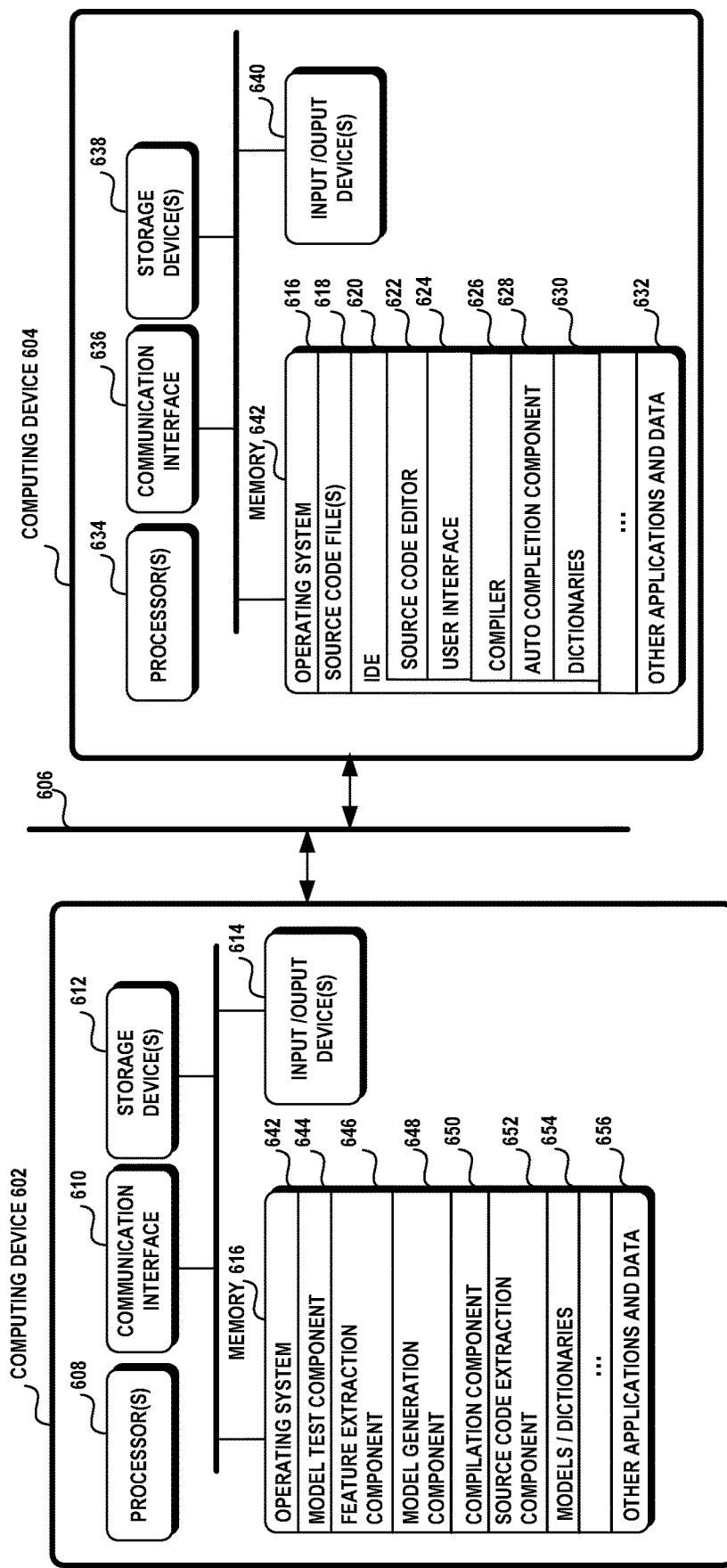
FIG. 6 is a block diagram illustrating an operating environment.

Attention now turns to a discussion of an exemplary operating environment. FIG. 6 illustrates an exemplary operating environment 600 in which a first computing device 602 is used to train the machine learning models and a second computing device 604 uses the machine learning models for code completion. However, it should be noted that the aspects disclosed herein is not constrained to any particular configuration of devices. Computing device 602 may utilize the machine learning models in its own code completion system and computing device 604 may generate and test machine learning models as well. Computing device 602 may be configured as a cloud service that generates machine learning model as a service for other code completion systems. The operating environment is not limited to any particular configuration.

The computing devices 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or a combination thereof. The operating environment 600 may be configured in a network environment, a distributed environment, a multi-processor environment, or a stand-alone computing device having access to remote or local storage devices.

The computing devices 602, 604 may include one or more processors 608, 634, a communication interface 610, 636, one or more storage devices 612, 638, one or more input/output devices 614, 640, and a memory 616, 642. A processor 608, 634 may be any commercially available or customized processor and may include dual microprocessors and multi-processor architectures. The communication interface 610, 636 facilitates wired or wireless communications between the computing device 602, 604 and other devices. A storage device 612, 638 may be computer-readable medium that does not contain propagating signals, such as modulated data signals transmitted through a carrier wave. Examples of a storage device 612, 638 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 638 in the computing devices 602, 604. The input/output devices 614, 640 may include a keyboard, mouse, pen, voice input device, touch input device, display, speakers, printers, etc., and any combination thereof.

A memory 616, 642 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 616, 642 may also include one or more external storage devices or remotely located storage devices that do not pertain to propagated signals, such as modulated data signals transmitted through a carrier wave.

Computing device 604 may utilize an integrated development environment (IDE) 620 that allows a user (e.g., developer, programmer, designer, coder, etc.) to design, code, compile, test, run, edit, debug or build a program, set of programs, web sites, web applications, and web services in a computer system. Software programs can include source code files 618, created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like). The IDE 620 may provide a native code development environment or may provide a managed code development that runs on a virtual machine or may provide a combination thereof. The IDE 620 may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code files 618 according to known software programming techniques and the specific logical and syntactical rules associated with a particular source language via a user interface 624 and a source code editor 622 in the IDE 620. Thereafter, the source code files 618 can be compiled via a compiler 626, such as a front end or language compiler. During this compilation process, the front-end compiler 626 generates data structures representing the syntactic structure and semantic model of the source code.

The memory 642 may contain instructions, components, and data. A component is a software program that performs a specific function and is otherwise known as a module, program, and/or application. The memory 642 may include an operating system 616, one or more source code files 618, an IDE that may include a source code editor 622, a user interface 624, a compiler 626, an autocompletion component 628, dictionaries 630 and other applications and data 632. Memory 616 may include an operating system 642, a model test component 644, a feature extraction component 646, a model generation component 648, a compilation component 650, a source code extraction component 652, models/ dictionaries 654, and other applications and data 656.

The computing devices 602, 604 may be communicatively coupled via a network 606. The network 634 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 634 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Figure 12:
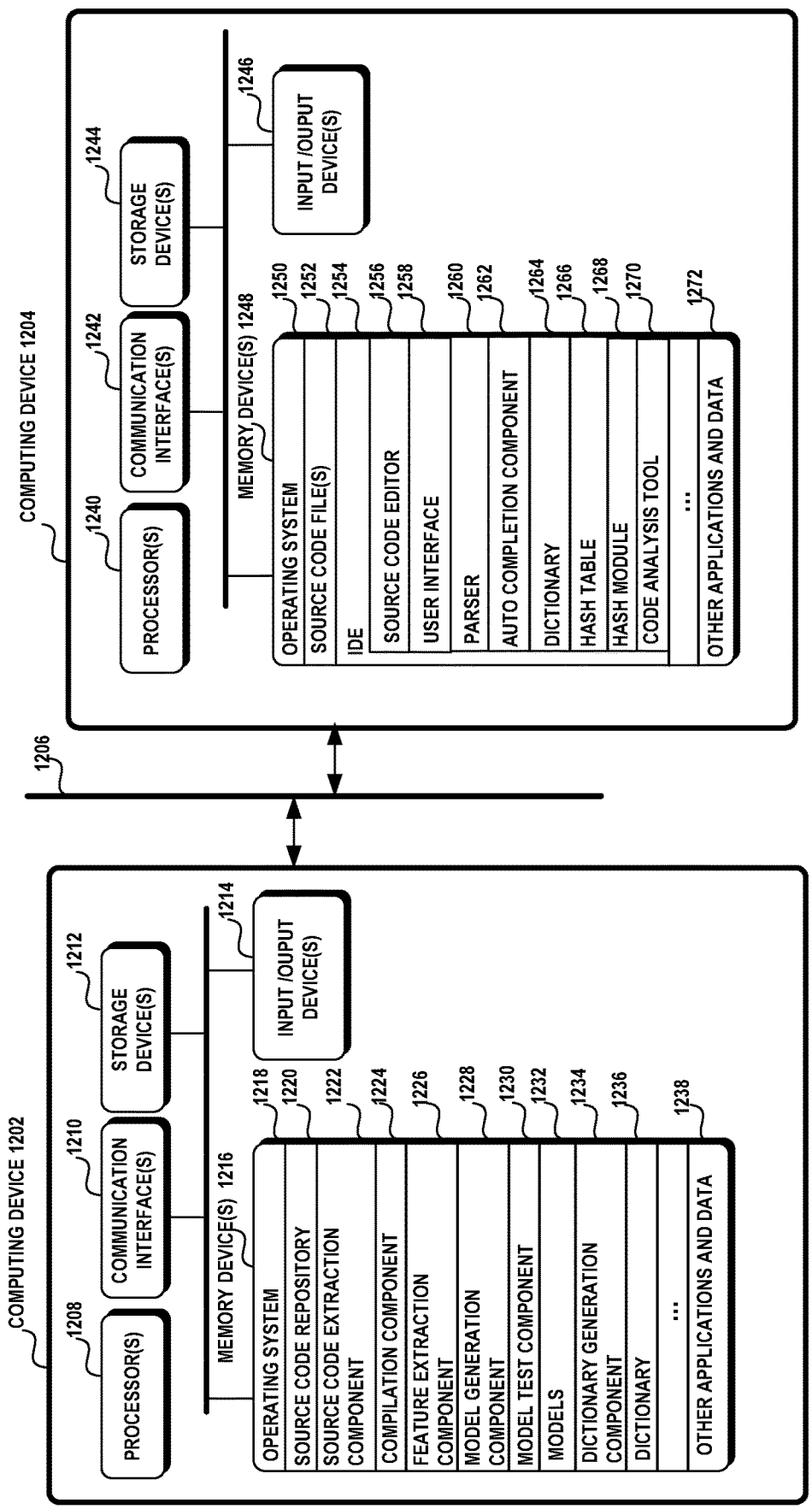
FIG. 12 is a block diagram illustrating a second exemplary operating environment

FIG. 12 illustrates a second exemplary operating environment in which a first computing device 602 is used to train the machine learning models and a second computing device 604 uses the machine learning models in a hash-based dictionary for code completion. The first computing device 1202 and second computing devices 1204 are connected via a network 1206. The network 1206 is described as above with respect to FIG. 6.

The first computing device 1202 contains one or more processors 1208, one or more communication interfaces 1210, one or more storage devices 1212, one or more input/output devices 1214, and one or more memory devices 1216. The second computing device 1204 contains one or more processors 1240, one or more communication interfaces 1242, one or more storage devices 1244, one or more input/output devices 1246, and one or more memory devices 1248. The processors, communication interfaces, storage devices, input/output devices, and memory devices are described above with respect to FIG. 6.

In one configuration, the first computing device 1202 generates the models and may provide the models as a web service. The memory device 1216 of the first computing device 1202 may include an operating system 1218, a source code repository 1220, a source code extraction component 1222, a compilation component 1224, a feature extraction component 1226, a model generation component 1228, a model test component 1230, the models 1232, a dictionary generation component 1234, a dictionary 1236, and other application and data 1238.

The second computing device 1204 uses the models in a hash-based dictionary as part of a source code editor, IDE, or a web service that provides source code development services. The memory device 1248 may include an operating system 1250, source code files 1252, an IDE 1254, and other applications and data 1272. The IDE may include a source code editor 1256, a user interface 1258, a parser 1260, an auto completion component 1262, a dictionary 1264, a hash table 1266, a hash module 1268, and a code analysis tool 1270.

A system is disclosed that contains one or more processors, a memory and one or more programs, where the one or more programs are stored in memory. The one or more programs are configured to be executed by the one or more processors and have instructions for generating a data structure representing a syntactic structure and a semantic model of a program, extracting a plurality of features from the data structure to construct one or more feature vectors, the plurality of features including characteristics of a context of a method invocation found within a program, and training a sequential model for a first class from the one or more feature vectors to predict a next method invocation for code completion following one or more preceding method invocations of a same class as the first class, wherein the sequential model includes one or more sequences of method invocations with probabilities for transitioning between each method invocation in the one or more sequences.

The sequential model may be an n-order Markov chain model. The data structure includes a syntax tree and a semantic model and is generated from compilation of the program. The characteristics of a context of a method invocation includes one or more of a spatial position of a method invocation, a name of a class associated with a method invocation, a name of a method or property invoked, and a name of a function containing a method invocation. The characteristics of a context of a method invocation may also include whether a method invocation is included in a conditional branch and identifiers indicating whether a method invocation is associated with an override, static, virtual, definition, abstract, and/or sealed keyword.

A device is disclosed that includes at least one processor and a memory. The device is configured to extract one or more features from a plurality of source code programs where a source code program has one or more method calls. The features represent a context in which a method is called in the source code program and at least one feature represents a location of the called method in the program. The device is further configured to generate one or more sequences of method calls of length n from the extracted one or more features. A sequence includes method calls occurring in successive order. A sequence includes a probability from transitioning from one method in a sequence to an immediately succeeding method in the sequence, wherein the sequences and probabilities are computed from usage patterns of historical source code programs. The device is further configured to train sequences to predict a method to complete a method invocation in a program using a context of the method invocation and at least one immediately preceding method invocation.

A sequence of method calls of length n are represented as an n-order Markov chain model. The features may include a name of a class associated with a method invocation, a name of a method or property invoked, a name of a function containing a method invocation, an indication of whether a method invocation is included in a conditional branch, and identifiers indicating whether a method invocation is associated with an override, static, virtual, definition, abstract, and/or sealed keyword. The features are extracted from a syntax tree and/or semantic model representation of the plurality of source code programs. The syntax tree and semantic model representation of a source code program is generated from a compilation of a source code program.

A method is disclosed that can implemented on a system or device disclosed herein which obtains at least one method invocation in a source code program occurring immediately preceding a current position in a source code editor, determines a class associated with input at the current position, utilizes a Markov chain model to predict one or more recommendations of methods to complete a method invocation at the current position, and produces the one or more predicted recommendations of methods using the Markov chain model using the at least one previous method invocation in the source code program and characteristics of a context at the current position.

The Markov chain model includes one or more sequences of method invocations where a sequence includes transition probabilities representing a likelihood of transitioning from one method invocation to another method invocation in a sequence. The method generates a data structure that tracks a syntax structure and semantic model of the source code program in the source code editor and uses the data structure to obtain the at least one previous method invocation in a source code program occurring immediately preceding the current position. The method uses the data structure to obtain the characteristics of the context of the current position. The method ranks the one or more predicted code completion recommendations in order of highest probability.

A system is disclosed having one or more processors and a memory. The system has one or more programs stored in the memory and configured to be executed by the one or more processors. The one or more programs including instructions for: detecting a partially-formed method invocation having a class without a method during a source code editing session; tracking a sequence of n method invocations immediately preceding the partially-formed method invocation, at least one of the methods in the sequence of n method invocation of a different class than the class of the partially-formed method invocation; using a hash value of the sequence of n method invocations to search for one or more candidates from a sequential model to complete the partially-formed method invocation, wherein the sequential model includes one or more methods likely to complete the partially-formed method invocation; and upon the search finding the one or more candidates, providing the one or more candidates to the source code editing session to complete the partially-formed method invocation.

In one aspect, the one or more programs including further instructions for constructing the sequential model as a hash table, the hash table indexed by the hash value of the sequence of n method invocations, the hash table having one or more entries in a ranked order of decreasing probability, an entry having a hash value of a method name representing a candidate predicted to complete the partially-formed method invocation. In one aspect, the one or more programs including further instructions for upon the search not finding the one or more candidates, forming a second hash value of a sequence of n method invocations immediately preceding the partially-formed method invocation, wherein the sequence of n method invocations immediately preceding the partially-formed method invocation are of a same class as the class of the partially-formed method invocation; and searching for the second hash value in the sequential model.

In one aspect, the one or more programs including further instructions for: upon the search not finding the second hash value in the sequential model, forming a third hash value of a sequence of n−1 method invocations immediately preceding the partially-formed method invocation, wherein at least one method in the sequence of n−1 method invocations immediately preceding the partially-formed method invocation is of a different class than the class of the partially-formed method invocation and searching for the third hash value in the sequential model.

In one aspect, the one or more programs including further instructions for: upon the search not finding the third hash value in the sequential model, forming a fourth hash value of a sequence of n−1 method invocations immediately preceding the partially-formed method invocation, wherein the sequence of n−1 method invocations immediately preceding the partially-formed method invocation are of a same class as the class of the partially-formed method invocation; and searching for the fourth hash value in the sequential model.

In one aspect, the one or more programs including further instructions for: upon the search not finding the fourth hash value, obtaining a cold-start method associated with the class; and providing the cold-start method to the source code editing session to complete the partially-formed method invocation. In one aspect, the sequential model is a n-state Markov chain model. In one aspect, the one or more programs including further instructions for: generating a hash table containing a hash value for each method associated with the class of the partially-formed method invocation and a corresponding method name; and using the hash table to map a hash value of a candidate to a corresponding method name.

A method is disclosed comprising: obtaining a dictionary having a plurality of models, a model associated with a class of a programming language, wherein a model is indexed by a hash value of a class name, a model having one or more entries, an entry having one or more candidates, an entry indexed by a hash value of a sequence of n method invocations, a candidate representing a method likely to complete a partially-formed method invocation following the sequence of n method invocations; searching the dictionary for a candidate to complete a partially-formed method invocation associated with a first class using a first sequence of n method invocations preceding the partially-formed method invocation in source code under development, the methods of the first sequence of n method invocations of different classes than the first class, the search matching a hash value of the first sequence of n method invocations preceding the partially-formed method invocation with entries of the dictionary; and upon the search finding at least one candidate from the dictionary that matches the has value of the first sequence, mapping a hash value of the at least one candidate into a corresponding method name and returning the corresponding method name.

In one aspect, the method further comprises: upon the search not finding the at least one candidate from the dictionary that matches the first sequence, generating a second sequence of n method invocations preceding the partially-formed method invocation, the second sequence having methods of a same class as the first class; and searching the dictionary for at least one candidate to complete a partially-formed method invocation associated with a first class using the second sequence.

In one aspect, the method further comprises: upon the search not finding at least one candidate from the dictionary that matches the second sequence, generating a third sequence of n−1 method invocations preceding the partially-formed method invocation, the third sequence having methods of different classes than the first class; and searching the dictionary for a candidate to complete a partially-formed method invocation associated with a first class using the third sequence.

In an aspect, the method further comprises: upon the search not finding at least one candidate from the dictionary that matches the third sequence, generating a fourth sequence of n−1 method invocations preceding the partially-formed method invocation, the fourth sequence having methods of a same class as the first class; and searching the dictionary for at least one candidate to complete a partially-formed method invocation associated with a first class using the fourth sequence. In an aspect, the method further comprises: upon the search not finding at least one candidate from the dictionary that matches the fourth sequence, returning a cold start method. In an aspect, the model is a n-state Markov chain model. In an aspect, a model is formatted as a table of attribute-value pairs, wherein an attribute is a hash value of a sequence of n preceding method invocations, and wherein a value is a hash value of a method name having a probability of following the partially-formed method invocation.

A device is disclosed having at least one processor and a memory. The at least one processor is configured to: track sequences of method invocations in a method under development; upon detection of a request to predict a method name to complete a method invocation of a first class, select a first sequence of the tracked sequences to predict the method name, wherein the first sequence includes n immediately preceding method invocations, at least one method invocation of the first sequence different from the first class; search for candidates associated with the first sequence from a sequential model, the sequential model containing candidates in a ranked order of descending probability of completing the method invocation of the first class; and upon a match of the first sequence in the sequential model, return one or more candidates.

In one aspect, the at least one processor is configured to: upon a failure to find candidates associated with the first sequence, select a second sequence from the tracked sequences, wherein the second sequence includes n immediately preceding method invocations of classes from a same class as the first class; search for candidates associated with the second sequence from the sequential model; and upon a match of the second sequence in the sequential model, return one or more candidates.

In an aspect, the at least one processor is further configured to: upon a failure to find candidates associated with the second sequence, select a third sequence from the tracked sequences, wherein the third sequence includes n−1 immediately preceding method invocations, at least one method in the third sequence of a different class than the first class; search for candidates associated with the third sequence from the sequential model; and upon a match of the third sequence in the sequential model, return one or more of the candidates.

In an aspect, the at least one processor is further configured to: upon a failure to find candidates associated with the third sequence, select a fourth sequence from the tracked sequences, wherein the third sequence includes n−1 immediately preceding method invocations of a same class as the first class; search for candidates associated with the fourth sequence from the sequential model; and upon a match of the fourth sequence in the sequential model, return one or more of the candidates. In an aspect, the at least one processor is further configured to: upon a failure to find candidates associated with the fourth sequence, return a cold start method as the candidate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
obtaining a dictionary having a plurality of models, a model associated with a class of a program, wherein a model is indexed by a hash value of a class name, a model having one or more entries, an entry having one or more candidates, an entry indexed by a hash value of a sequence of n method invocations, a candidate representing a method likely to complete a partially-formed method invocation following the sequence of n method invocations;
searching the dictionary, using a hash value of a first sequence of n method invocations preceding a partially-formed method invocation, for a candidate matching the hash value of the first sequence of n method invocations to complete the partially-formed method invocation, wherein the partially-formed method invocation is associated with a first class, wherein methods of the first sequence of n method invocations of a different class than the first class; and
upon the search finding at least one hash value of a candidate from the dictionary that matches the hash value of the first sequence, mapping the hash value of the candidate into a corresponding method name to complete the partially-formed method invocation.

2. The method of claim 1, further comprising:
upon the search not finding the candidate from the dictionary that matches the hash value of the first sequence, generating a hash value of a second sequence of n method invocations preceding the partially-formed method invocation, the second sequence having methods of a same class as the first class; and
searching the dictionary for at least one candidate to complete the partially-formed method invocation associated with the first class using the hash value of the second sequence.

3. The method of claim 2, further comprising:
upon the search not finding the candidate from the dictionary that matches the hash value of the second sequence, generating a hash value of a third sequence of n−1 method invocations preceding the partially-formed method invocation, the third sequence having a method of a different class than the first class; and
searching the dictionary for a candidate to complete a partially-formed method invocation associated with the first class using the hash value of the third sequence.

4. The method of claim 3, further comprising:
upon the search not finding the candidate from the dictionary that matches the hash value of the third sequence, generating a fourth sequence of n−1 method invocations preceding the partially-formed method invocation, the fourth sequence having methods of a same class as the first class; and
searching the dictionary for a candidate to complete a partially-formed method invocation associated with the first class using the hash value of the fourth sequence.

5. The method of claim 4, further comprising:
upon the search not finding the candidate from the dictionary that matches the hash value of the fourth sequence, returning a cold start method.

6. The method of claim 1, wherein the model is a n-state Markov chain model.

7. The method of claim 1, wherein a model is formatted as a table of attribute-value pairs, wherein an attribute is a hash value of a sequence of n preceding method invocations, and wherein a value is a hash value of a method name having a probability of following the partially-formed method invocation.

8. A system comprising:
one or more processors; and a memory;
one or more programs, wherein the one or more programs are stored in memory and configured to be executed by the one or more processors, the one or more programs including instructions that perform actions for:
detecting a partially-formed method invocation having a class without a method name during a source code editing session;
tracking a sequence of n method invocations immediately preceding the partially-formed method invocation, at least one of the methods in the sequence of n method invocation of a different class than the class of the partially-formed method invocation;
using a hash value of the sequence of n method invocations to search for candidates from a sequential model to complete the partially-formed method invocation, wherein the sequential model includes hash values of one or more methods likely to complete the partially-formed method invocation; and
upon the search finding a hash value of a candidate, mapping the hash value of the candidate into a method name to complete the partially-formed method invocation.

9. The system of claim 8, wherein the sequential model is constructed as a hash table, the hash table indexed by the hash value of the sequence of n method invocations, the hash table having one or more entries in a ranked order of decreasing probability, an entry having a hash value of a method name representing a candidate predicted to complete the partially-formed method invocation.

10. The system of claim 8, wherein the one or more programs including further instructions for:
upon the search not finding the candidate, forming a second hash value of a sequence of n method invocations immediately preceding the partially-formed method invocation, wherein the sequence of n method invocations immediately preceding the partially-formed method invocation is of a same class as the class of the partially-formed method invocation; and
searching for the second hash value in the sequential model.

11. The system of claim 10, wherein the one or more programs including further instructions for:
upon the search not finding the second hash value in the sequential model, forming a third hash value of a sequence of n−1 method invocations immediately preceding the partially-formed method invocation, wherein at least one method in the sequence of n−1 method invocations immediately preceding the partially-formed method invocation is of a different class than the class of the partially-formed method invocation; and
searching for the third hash value in the sequential model.

12. The system of claim 11, wherein the one or more programs including further instructions for:
upon the search not finding the third hash value in the sequential model, forming a fourth hash value of a sequence of n−1 method invocations immediately preceding the partially-formed method invocation, wherein the sequence of n−1 method invocations immediately preceding the partially-formed method invocation is of a same class as the class of the partially-formed method invocation; and
searching for the fourth hash value in the sequential model.

13. The system of claim 12, wherein the one or more programs including further instructions for:
upon the search not finding the fourth hash value, obtaining a cold-start method associated with the class of the partially-formed method invocation; and
providing the cold-start method to the source code editing session to complete the partially-formed method invocation.

14. The system of claim 8, wherein the sequential model is a n-state Markov chain model.

15. The system of claim 8, wherein the sequential model is associated with a class of the partially-formed method invocation.

16. A device, comprising:
at least one processor and a memory;
wherein the at least one processor is configured to perform actions that:
track sequences of method invocations in a method under development;
upon detection of a request to predict a method name to complete a method invocation of a first class, select a first sequence of the tracked sequences to predict the method name, wherein the first sequence includes n immediately preceding method invocations, at least one method invocation of the first sequence different from the first class;
generate a hash value for the first sequence;
search for hash values of candidates associated with the hash value of the first sequence from a sequential model, the sequential model containing candidates in a ranked order of descending probability of completing the method invocation of the first class; and
upon a match of the hashed value of the first sequence in the sequential model, map the hash value of the candidate to a method name to complete the method invocation of the first class.

17. The device of claim 16, wherein the at least one processor is configured to perform actions that:
upon a failure to find candidates associated with the first sequence, select a second sequence from the tracked sequences, wherein the second sequence includes n immediately preceding method invocations of classes from a same class as the first class;
generate a hash value for the second sequence;
search for hash values of candidates associated with the hash value of the second sequence from the sequential model; and
upon a match of the hash value of the second sequence in the sequential model, return a method name of the matching candidate.

18. The device of claim 17, wherein the at least one processor is further configured to performs actions that:
upon a failure to find candidates associated with the second sequence, select a third sequence from the tracked sequences, wherein the third sequence includes n−1 immediately preceding method invocations, at least one method in the third sequence of a different class than the first class;

search for hash values of candidates associated with the hash value of the third sequence from the sequential model; and upon a match of the hash value of the third sequence in the sequential model, return a method name of the matching candidate.

19. The device of claim 18, wherein the at least one processor is further configured to performs actions that:

upon a failure to find candidates associated with the third sequence, select a fourth sequence from the tracked sequences, wherein the third sequence includes n−1 immediately preceding method invocations of a same class as the first class;

generate a hash value for the fourth sequence;

search for candidates associated with the hash value of the fourth sequence from the sequential model; and upon a match of the hash value of the fourth sequence in the sequential model, return the method name of the matched candidate.

20. The device of claim 19, wherein the at least one processor is further configured to perform actions:

upon a failure to find candidates associated with the fourth sequence, return a cold start method as the candidate.

\* \* \* \* \*